June 4, 1968
E. C. ENGLE
3,386,340
FLUID POWER DRIVE UNIT HAVING ROTARY AND
RECIPROCATORY MOVEMENT
Filed Nov. 24, 1965
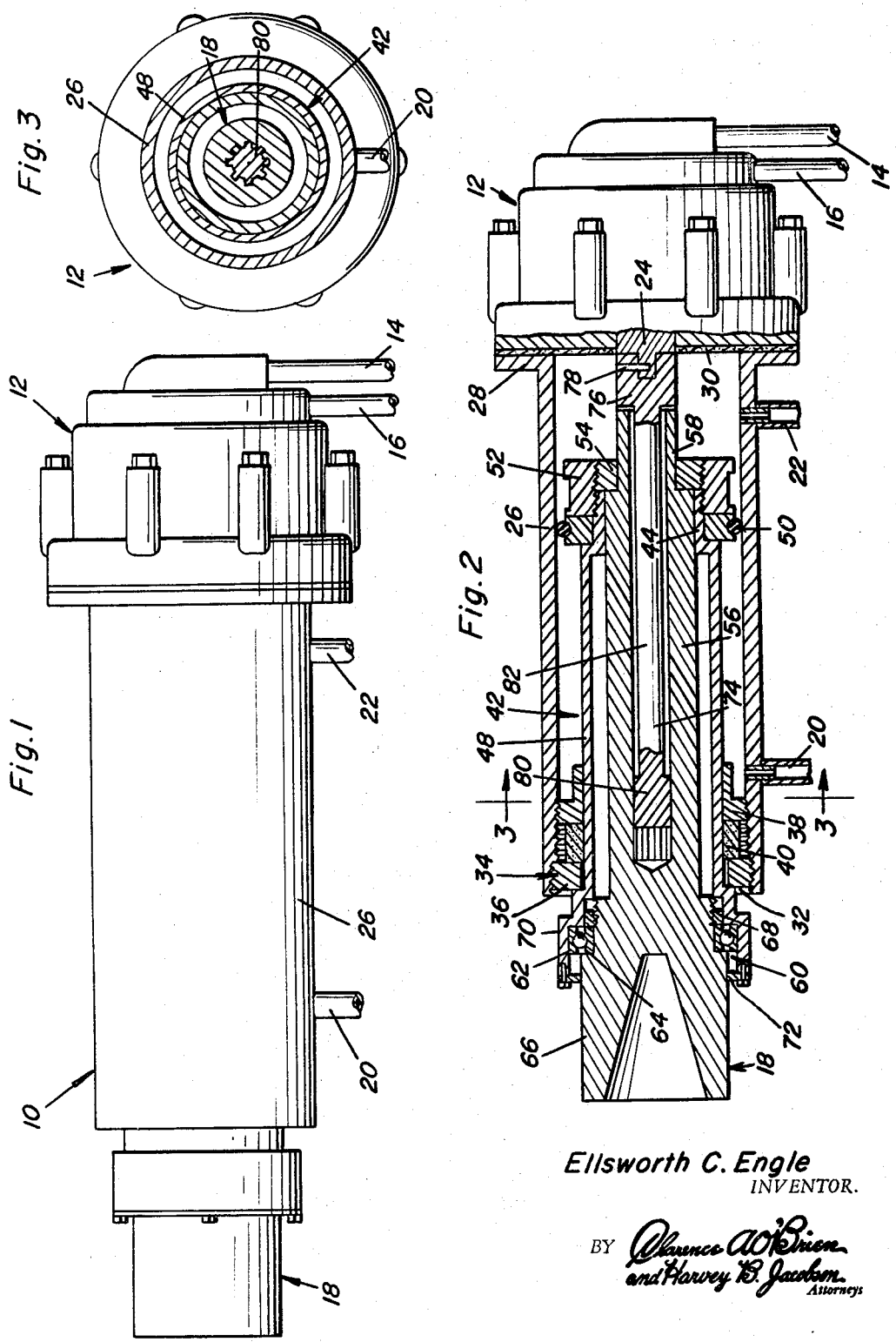
Ellsworth C. Engle
INVENTOR.

United States Patent Office 3,386,340
Patented June 4, 1968

3,386,340
FLUID POWER DRIVE UNIT HAVING ROTARY AND RECIPROCATORY MOVEMENT
Ellsworth C. Engle, 3340 Main St.,
Ravenna, Mich. 49451
Filed Nov. 24, 1965, Ser. No. 509,492
4 Claims. (Cl. 91—61)

ABSTRACT OF THE DISCLOSURE

A work or tool feeding attachment for fluid motors in which a piston assembly axially displaces a motor driven spindle extending from the motor through a housing enclosing the piston assembly. The piston is rotatably supported on an enlarged end of the spindle to which a workpiece or tool is secured outside of the housing, the forward end of which mounts a sealing limit stop.

---

This invention relates to the powered rotation and feeding of workpieces or tools and more particularly to a drive head of economical construction and reliable operation for transmitting both rotation and linear feeding movement to such workpieces or tools.

A primary object of the present invention therefore, is to provide a drive unit which may be powered by a fluid motor to simultaneously rotate and impart linear movement to a driven element, the drive unit being suitable for a wide variety of installations and metal working operations including drilling, tapping, boring, reaming, milling, etc.

An additional object of the present invention in accordance with the foregoing object, is to provide a fluid motor driven drive unit through which speed and feed controls for workpieces or tools are exercised and provided without the expense and bulkiness of prior drive units.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a drive unit constructed in accordance with the present invention.

FIGURE 2 is a longitudinal sectional view through the drive unit shown in FIGURE 1.

FIGURE 3 is a transverse sectional view taken substantially through a plane indicated by section line 3—3 of FIGURE 2.

Referring now to the drawings in detail, it will be observed from FIGURE 1 that the drive unit generally denoted by reference numeral 10 is associated with a rotating type of fluid motor 12. A fluid operating medium whether it be a gas or liquid, is therefore supplied to the fluid motor through the conduits 14 and 16 in order to impart rotation to a driven spindle 18 which in turn transmits rotation to a driven element such as a workpiece or tool. Axial displacement is also imparted to the driven spindle 18 at a controlled feed rate by supply of fluid under pressure to either conduit 20 or 22 depending upon the direction in which the diven spindle is to be axially displaced. The spindle is therefore provided with a chuck engaging socket 23 for connection thereof to a driven element.

Referring now to FIGURES 2 and 3, it will be observed that a rotating output shaft 24 projects from the fluid motor into a tubular housing 26 of the drive unit. The tubular housing is provided at one axial end with a flange 28 whereby the housing may be fixedly secured to the casing of the fluid motor 12 in any suitable fashion, a sealing gasket 30 being interposed between the flange 28 and the fluid motor casing so as to prevent leakage of fluid from the housing. The axial end 32 of the housing remote from the fluid motor, is internally threaded so as to mount therewithin an annular, fluid sealing, slide bearing assembly generally referred to by reference numeral 34 which constitutes the sole limit stop for limiting axial movement of a piston assembly in either direction as will be hereafter explained. The slide bearing assembly includes an externally threaded packing nut 36 axially spaced from a bearing sleeve 38 which is also externally threaded at one end for mounting within the housing. A packing gland 40 is held assembled between the packing nut 36 and the bearing sleeve 38 in wiping engagement with the external surface of a tubular or hollow piston rod 42 reciprocably mounted within the housing. The bearing assembly 34 is therefore operative to slidingly support the piston rod and prevent leakage of fluid from the housing.

The piston rod at one end within the housing, is provided with a small diameter shouldered portion 44 which supports a piston assembly consisting of an annular piston member 46 abutting the shoulder between the portion 44 and the intermediate portion 48 of the piston rod. An O-ring element 50 is seated within an annular groove formed in the piston member 46 for wiping engagement with the internal surface of the tubular housing. An internally threaded bearing bushing 52 is threadedly mounted on the portion 44 of the piston rod for holding the piston member 46 in assembled relation thereon. The bearing bushing 52 projects axially beyond the portion 44 of the piston rod so as to threadedly receive an externally threaded thrust ring element 54. The thrust ring element 54 abuts a shoulder formed between an intermediate diameter portion 56 and a small diameter end portion 58 of the spindle 18. Accordingly, relative axial displacement between the piston rod 42 and the spindle will be prevented in one direction by the thrust ring element 54. Relative axial displacement between the piston rod and the spindle is prevented in the other axial direction by means of a bearing assembly 60 mounted on the large diameter portion of the spindle at the axial end thereof outside of the housing 26. The bearing assembly 60 includes therefore, a ball bearing 62 the radially inner race of which is assembled against the shoulder 64 on the large diameter end portion 66 of the spindle by means of an assembly nut 68. The outer race of the ball bearing 62 is engaged with the stepped diameter portion 70 of the piston rod so as to rotatably support the spindle 18 within the piston rod. A protective annular member 72 is secured to the end of the stepped diameter portion 70 of the piston rod in wiping contact with the spindle 18 so as to enclose the bearing assembly 60. It will therefore be apparent, that the spindle may rotate relative to the piston rod with which it is reciprocable. Further, axial reciprocation of the piston rod is limited in one direction by abutment between the stepped diameter portion 70 thereof with the packing nut 36, axial displacement in the other direction being limited by abutment between the bearing sleeve 38 and the piston member 46.

Rotation is imparted to the spindle 18 by means of a slidable coupling interconnecting the motor shaft 24 with the spindle. The coupling includes therefore, an axially elongated spline shaft 74 having a large diameter end portion 76 to which the motor shaft is connected by the pin 78. An externally splined coupling portion 80 is formed at the other end of the spline shaft adjacent to the slide bearing assembly 34 for slidable engagement with the internal splines formed in an axially elongated bore 82 within the spindle. Thus, the spline shaft is operative to impart rotation to the spindle about the rotational axis of the motor shaft as well as to accommodate axial displacement of the spindle parallel to said axis. Axial displacement is imparted to the spindle by means of the piston shaft to which it is axially fixed by means of the thrust ring member 54 and the bearing assembly 60 as aforementioned. Fluid under pressure is therefore supplied to the fluid chamber of the tubular housing by means of supply conduits 20 and 22 connected to the housing on opposite sides of the piston assembly.

From the foregoing description, the construction, operation and utility of the drive unit of the present invention will be apparent. It will therefore be appreciated, that the arrangement of parts forming the drive unit may not only make for an economical drive unit but may also be assembled and disassembled in a facile manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a fluid motor having a rotatable output shaft, a drive unit for simultaneously rotating a driven element about the axis of said shaft and imparting linear movement thereto parallel to the axis comprising, an elongated tubular housing having opposite open ends, means fixedly securing the housing in sealed relation to the fluid motor at one of said ends, a fluid sealing bearing assembly mounted by said housing at the other of said ends, a tubular piston rod slidably mounted by the bearing assembly and having axially spaced shouldered portions respectively located inside the housing and outside of the housing in all positions relative to the housing, a spindle connected to the output shaft and received within the tubular piston rod, a piston assembly mounted on one of the shouldered portions of the piston rod in wiping engagement with the housing, thrust means engageable with the spindle within the housing locking the piston assembly against the spindle and said one of the shouldered portions of the piston rod inside of the housing, bearing means mounted within the other of the shouldered portions of the piston rod outside of the housing for rotatably supporting the spindle in spaced relation to the thrust means, said spindle having means for engaging the driven element at the other of said shouldered end portions thereof outside of the housing, and fluid supply means connected to the housing on opposite sides of the piston assembly for axial displacement of the piston rod.

2. The combination of claim 1 wherein said fluid sealing bearing assembly includes a packing nut threadedly mounted by the housing and engageable with said other of the shouldered portions of the piston rod outside of the housing for limiting axial displacement in one direction, a bearing sleeve mounted by the housing and engageable by the piston assembly to limit axial displacement of the piston rod in the other direction.

3. The combination of claim 2 wherein said spindle includes shouldered end portions axially projecting from the piston rod, an elongated bore formed in the spindle having internal splines, and a spline shaft connected to the output shaft of the motor extending into said bore through one of said shouldered end portions of the spindle, said spline shaft having a spline coupling portion engageable with said internal splines adjacent to the bearing assembly at the end of the housing remote from the fluid motor and said thrust means being mounted on said one of the shouldered end portions of the spindle.

4. In combination, a tubular housing having opposite axial ends, a fluid motor at one of the axial ends of the housing, an output spindle driven by the motor and extending through the housing, said spindle having an enlarged end portion projecting from the other of the axial ends of the housing, a tubular piston rod having an enlarged diameter end and an opposite reduced diameter end supported on the spindle, radial bearing means rotatably supporting the enlarged diameter end of the piston rod on the enlarged end portion of the spindle outside of the housing, a piston member fixedly mounted on the reduced diameter end of the piston rod within the housing, thrust means mounted by the piston rod at said reduced diameter end for engagement with the spindle to axially lock the piston rod to the spindle, and limit stop means mounted by the housing at said other of the axial ends for limiting axial displacement of the piston rod in either direction by abutment with the enlarged diameter end and the piston member, said limit stop means including a seal in wiping engagement with the piston rod between said ends thereof.

References Cited
UNITED STATES PATENTS

| 1,911,138 | 5/1933 | Cluthe | 91—61 |
| 2,750,816 | 6/1956 | Mott | 91—61 |
| 2,854,870 | 10/1958 | Chaffee | 91—61 |
| 3,075,503 | 1/1963 | Kimsey | 91—61 |

MARTIN P. SCHWADRON, *Primary Examiner.*

B. L. ADAMS, *Assistant Examiner.*